(12) United States Patent
Julitz et al.

(10) Patent No.: US 7,594,184 B2
(45) Date of Patent: Sep. 22, 2009

(54) COMPUTING SYSTEM FOR GRAPHICALLY MANIPULATING PRODUCTION PRINT STREAMS

(75) Inventors: John A Julitz, Plainfield, IL (US); John P Lynch, New Milford, CT (US); Kurt E. Konow, Naperville, IL (US); Eric C Olson, Woodridge, IL (US); Richard J. Olson, Orland Park, IL (US); Gary P. Chomuk, Lisle, IL (US)

(73) Assignee: Pitney Bowes Inc., Stamford, CT (US)

( * ) Notice: Subject to any disclaimer, the term of this patent is extended or adjusted under 35 U.S.C. 154(b) by 1200 days.

(21) Appl. No.: 10/936,267

(22) Filed: Sep. 8, 2004

(65) Prior Publication Data
US 2005/0188302 A1 Aug. 25, 2005

Related U.S. Application Data

(60) Provisional application No. 60/547,463, filed on Feb. 24, 2004.

(51) Int. Cl.
*G06F 3/00* (2006.01)

(52) U.S. Cl. ............ 715/769; 715/771; 715/964
(58) Field of Classification Search ........... 715/769, 715/771, 964, 767
See application file for complete search history.

(56) References Cited

U.S. PATENT DOCUMENTS

| 6,505,980 B1 * | 1/2003 | Allday ............... 400/61 |
|---|---|---|
| 2003/0145056 A1 * | 7/2003 | Fujisawa et al. ...... 709/205 |
| 2004/0056908 A1 * | 3/2004 | Bjornson et al. ...... 345/968 |
| 2005/0149617 A1 * | 7/2005 | Turnbull et al. ...... 709/203 |

* cited by examiner

*Primary Examiner*—Dennis Bonshock
(74) *Attorney, Agent, or Firm*—Michael J. Cummings; Angelo N. Chaclas

(57) ABSTRACT

A user interface associated with a print stream processing software tool allows a user define a print stream process application by "drag and drop" interaction with the user interface. Actions may be inserted in an action list by "dragging" items from a pallet to an action list icon. Attributes of the actions may be "dragged" from an input file icon. The resulting actions may further be defined by "dragging" objects created by the actions to an output file icon. Rules to process a print stream are generated from the action list.

12 Claims, 9 Drawing Sheets

|  | START | PAGE | DOCUMENT | PRESORT | FINISH |
|---|---|---|---|---|---|
| INPUT 1.ADDRESS 1 | | | | | |
| INPUT 1.ADDRESS 2 | | | | | |
| INPUT 1.ADDRESS 3 | | | | | |
| SW.ADDRESS BLOCK | | | | | |
| INPUT1.NAME | | | | | |
| SW.PBSS_ADDRESS_LINE1 | | | | | |
| SW.PBSS_ADDRESS_LINE2 | | | | | |
| SW.PBSS_ADDRESS_LINE3 | | | | | |
| SW.PBSS_ADDRESS_LINE4 | | | | | |

FIG. 10

COMPUTING SYSTEM FOR GRAPHICALLY MANIPULATING PRODUCTION PRINT STREAMS

CROSS REFERENCE TO RELATED APPLICATION

This application claims the benefit of U.S. provisional patent application Ser. No. 60/547,463, filed Feb. 24, 2004 now abandoned and entitled "Computing System for Graphically Manipulating Production Print Streams", which is incorporated herein by reference.

BACKGROUND OF THE INVENTION

This invention relates generally to the field of document processing and more particularly to facilitating creation of projects to convert input print files to different formats.

The "Streamweaver"® software tool available from Pitney Bowes Inc., the assignee hereof, allows users to modify the format of print stream files. It would be desirable to enhance users' ability to define projects in which print stream file formats are modified.

SUMMARY OF THE INVENTION

Accordingly, a method and apparatus are provided for enhanced user interactions with print stream modification tools.

In one aspect, a method includes displaying on a display device (i) a first icon that represents an input file, (ii) a second icon that represents an output file to be derived at least in part from the input file, and (iii) a third icon that represents a list of actions to be performed to derive the output file. The method further includes receiving user input, modifying the list of actions in response to the user input, and generating rules to derive the output file. The rules correspond to the actions of the list of actions.

The displaying step may include displaying the first, second and third icons simultaneously on the display device with the third icon between the first and second icons. The method may further include displaying an actions pallet and a variables list on the display device simultaneously with the first, second and third icons.

The receiving of user input may include the user dragging an item from the actions pallet to the third icon, dragging an item from the first icon to the third icon to associate the item from the first icon with an action of the list of actions, and dragging an item from the third icon to the second icon to define an attribute of an action of the list of actions. The receiving of user input may also include the user defining a condition that is applicable to an action of the list of actions. The output file may be for printing a letter or an envelope.

In another aspect, an apparatus may include at least one processor, a display device controlled by the at least one processor and at least one memory in communication with the at least one processor. The at least one memory stores instructions to cause the at least one processor to perform some or all of the method steps described above.

Methods and apparatus in accordance with the invention may allow users of a document processing system to conveniently modify documents for a print stream without requiring the users to understand details of the document formats.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 5-10; are example screen displays that may be provided by the system of FIG. 1.

DETAILED DESCRIPTION

In the method and apparatus of the present invention, a graphical user interface allows a user to drag items from one icon to another on a display to conveniently define a process for deriving one or more output document files from one or more input document files.

Figure 1:
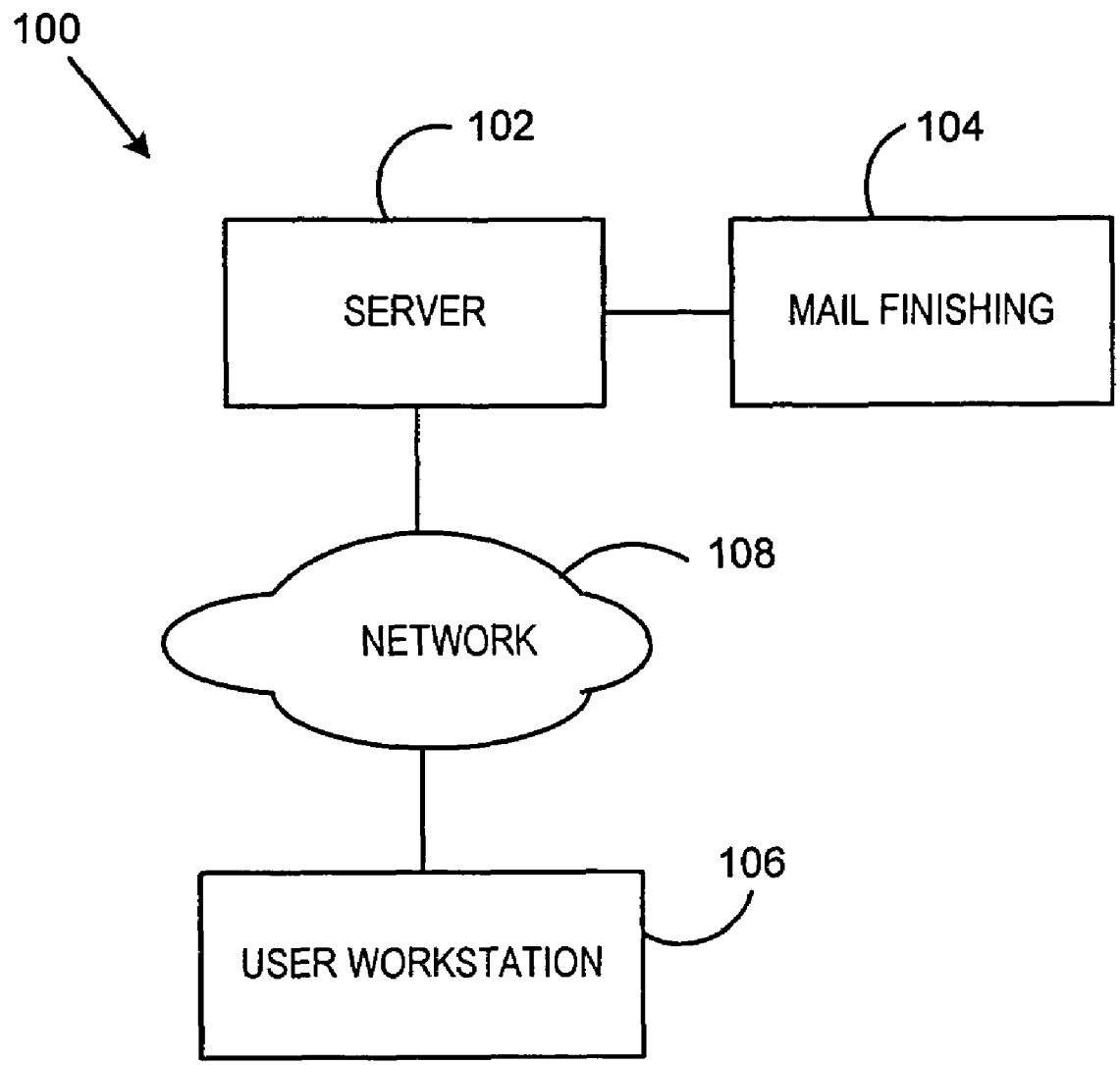
FIG. 1; is a block diagram of a document processing system provided in accordance with the invention.

Referring now to the drawings, and particularly to FIG. 1, the reference numeral 100 indicates generally an apparatus for processing documents in accordance with an embodiment of the present invention. Generally, in some embodiments, system 100, in its hardware aspects, may be constituted by conventional computer hardware and printing/inserting equipment. The system 100 includes a server computer 102 and mail finishing equipment 104 coupled to and controlled by the server 102. The mail finishing equipment may perform one or more of the functions of printing letters, bills, invoices, statements and/or other documents, printing envelopes and/or inserting items in envelopes.

The system 100 further includes at least one user workstation 106 that may be in communication with the server 102 from time to time via a data communication network 108.

Figure 2:
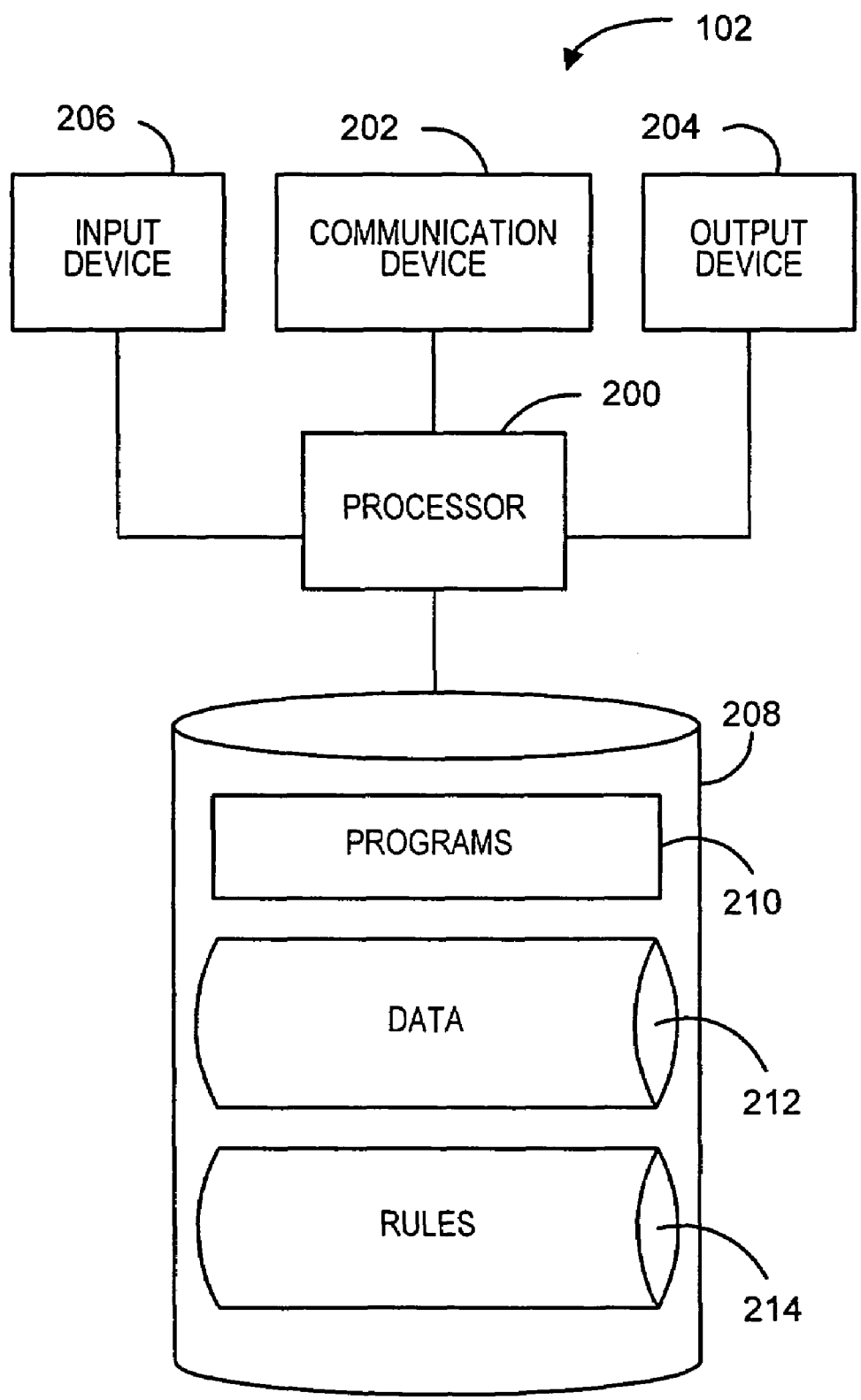
FIG. 2; is a block diagram of a server computer that is part of the system of FIG. 1.

FIG. 2 is a block diagram that illustrates an embodiment of the server 102 shown in FIG. 1. As seen from FIG. 2, the server 102 may include a processing unit 200. The processing unit 200 may be constituted by one or more processors of the type used in server computers. The server 102 may also include a communication device 202 in 10 communication with the processing unit 200. The communication device 202 may, for example, comprise one or more data communication ports by which the processing unit 200 may exchange data communications with the user workstation 106 and/or the mail finishing equipment 104 and/or may provide control signals to the mail finishing equipment 104.

The server 102 may further include an output device 204 in communication with the processing unit 200 and an input device 206 in communication with the processing unit 200. The output device 204 may, for example, comprise one or more printers and/or one or more display monitors. The input device 206 may include conventional devices such as a keyboard and/or mouse or other pointing device. The input device 206 may be used by a human operator to control, administer, maintain or provide input to the server 102.

There may also be included in the server 102 a storage device 208 that is in communication with the processing unit 200. The storage device 208 may comprise, for example, a combination of magnetic, optical and/or semiconductor memory devices. In some embodiments, the storage device 208 may include one or more hard disk drives, RAM (random access memory), ROM (read only memory) and one or more drives for removable data storage media.

The storage device 208 may store one or more software programs 210 that control operation of the server 102. For example, the software programs may include an operating system, data communications software, database management software, device drivers and one or more application programs that control the server 102 to perform process steps in accordance with the present invention, as described herein. The storage device 208 may also store data 212 that corresponds to a print stream to be processed via the mail finishing equipment 104, and rules 214 that define processes for deriving output print files from input document files. The rules may be generated by the system 100 based on user input such as that-described below.

Figure 3:
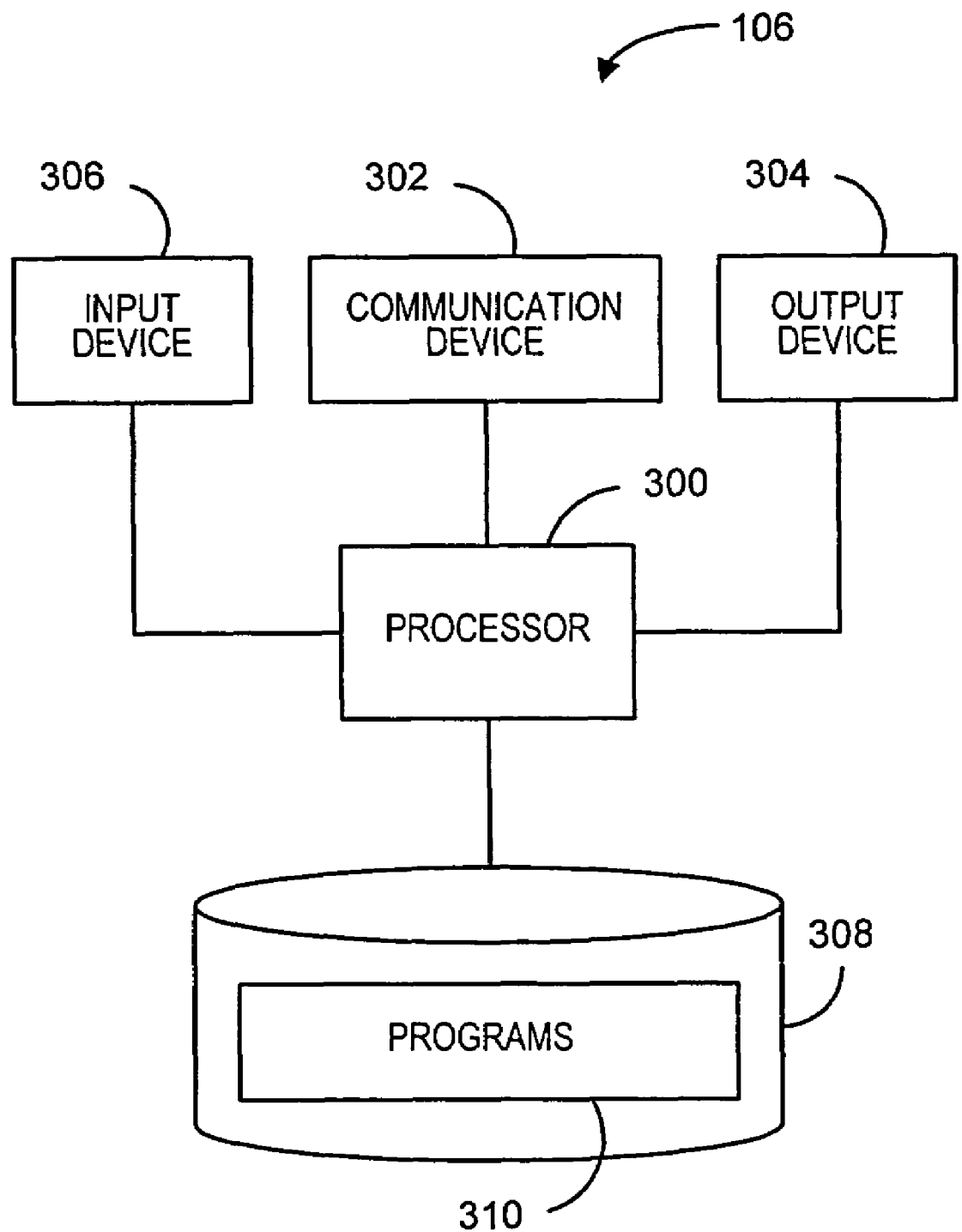
FIG. 3; is a block diagram of a user workstation that is part of the system of FIG. 1.

FIG. 3 is a block diagram that illustrates an embodiment of the user workstation 106 shown in FIG. 1. In some embodiments, the user workstation 106 may be constituted in its hardware aspects by a conventional personal computer. As seen from FIG. 3, the user workstation 106 may include a processing unit 300. The processing unit 300 may be constituted by one or more processors of the type used in personal computers. The user workstation 106 may also include a communication device 302 in communication with the processing unit 300. The communication device 302 may, for example, comprise one or more data communication ports by which the processing unit 300 may exchange data communications with the server computer 102.

The user workstation 106 may further include an output device 304 in communication with the processing unit 300 and an input device 306 in communication with the processing unit 300. The output device 304 may, for example, comprise one or more printers and/or one or more display devices such as CRT or flat panel monitors. The input device 306 may include conventional devices such as a keyboard and/or mouse or other pointing device. The input device 306 may be used by a user to provide input to the user workstation 106 and to the system 100 via the user workstation 106.

There may also be included in the user workstation 106 a storage device 308 that is in communication with the processing unit 300. The storage device 308 may comprise, for example, a combination of magnetic, optical and/or semiconductor memory devices. In some embodiments, the storage device 308 may include one or more hard disk drives, RAM (random access memory), ROM (read only memory) and one or more drives for removable data storage media.

The storage device 308 may store one or more software programs 310 that control operation of the user workstation 106. For example, the software programs may include an operating system, data communications software, database management software, device drivers and one or more application programs that control the user workstation 106 to perform process steps in accordance with the present invention, as described herein.

Figure 4:
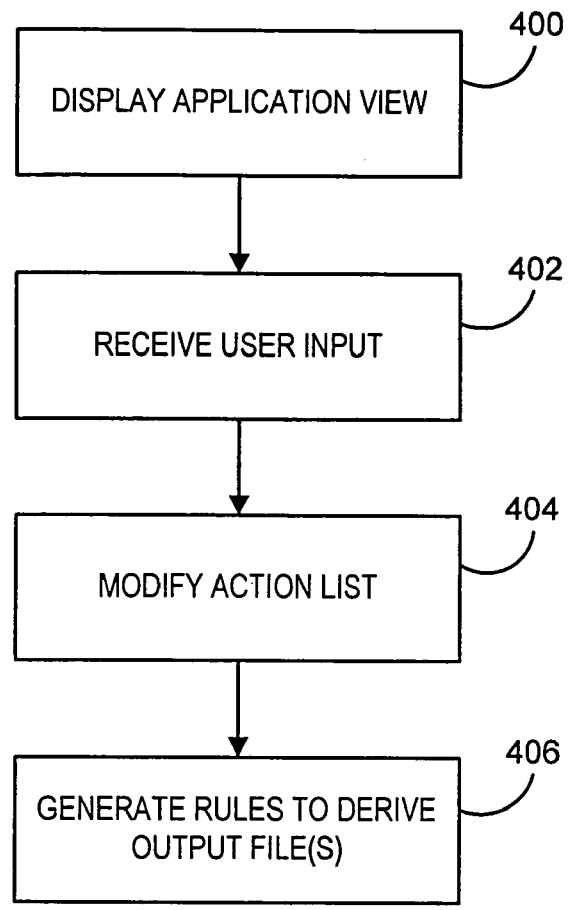
FIG. 4; is a flow chart that illustrates a process that may be performed in accordance with the invention by the system of FIG. 1.
Figure 5:
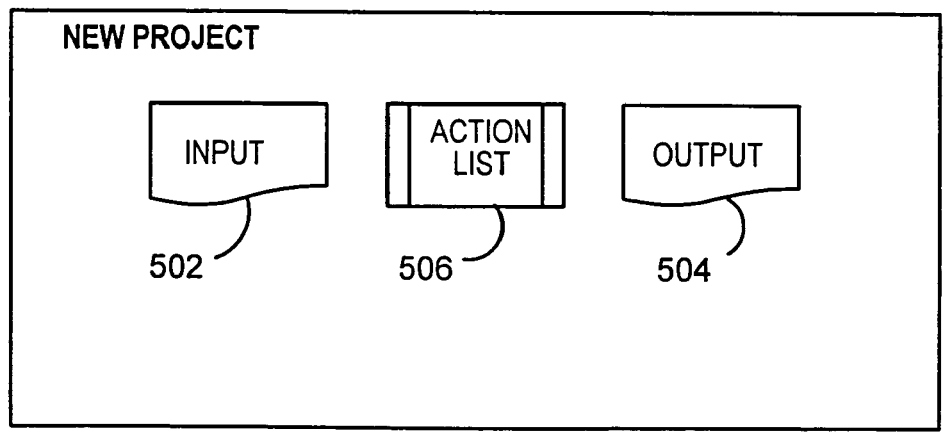

FIG. 4 is a flow chart that illustrates a process that may be performed in accordance with the invention by the system 100. At step 400 in FIG. 4, the user workstation 106 displays on a display device (output device 304) a user interface display that may be referred to as an "application view". Examples of the application view as displayed in response to various user actions are shown in FIGS. 5-8. For instance, referring to FIG. 5, there are simultaneously displayed as part of the application view an input file icon 502, an output file icon 504 and an action list icon 506. The input file icon 502 represents an input file to be modified to produce at least one output file. The output file icon 504 represents an output file to be derived at least in part from the input file represented by the input file icon 502. The action list icon 506 represents a list of actions to be performed by the system (in accordance with the wishes of the user) to derive the output file represented by the output file icon 504 from one or more input files including the input file represented by the input file icon. In some embodiments, the action list icon 506 may be displayed between the input file icon 502 and the output file icon 504, as indicated in, e.g., FIG. 5.

Figure 6:
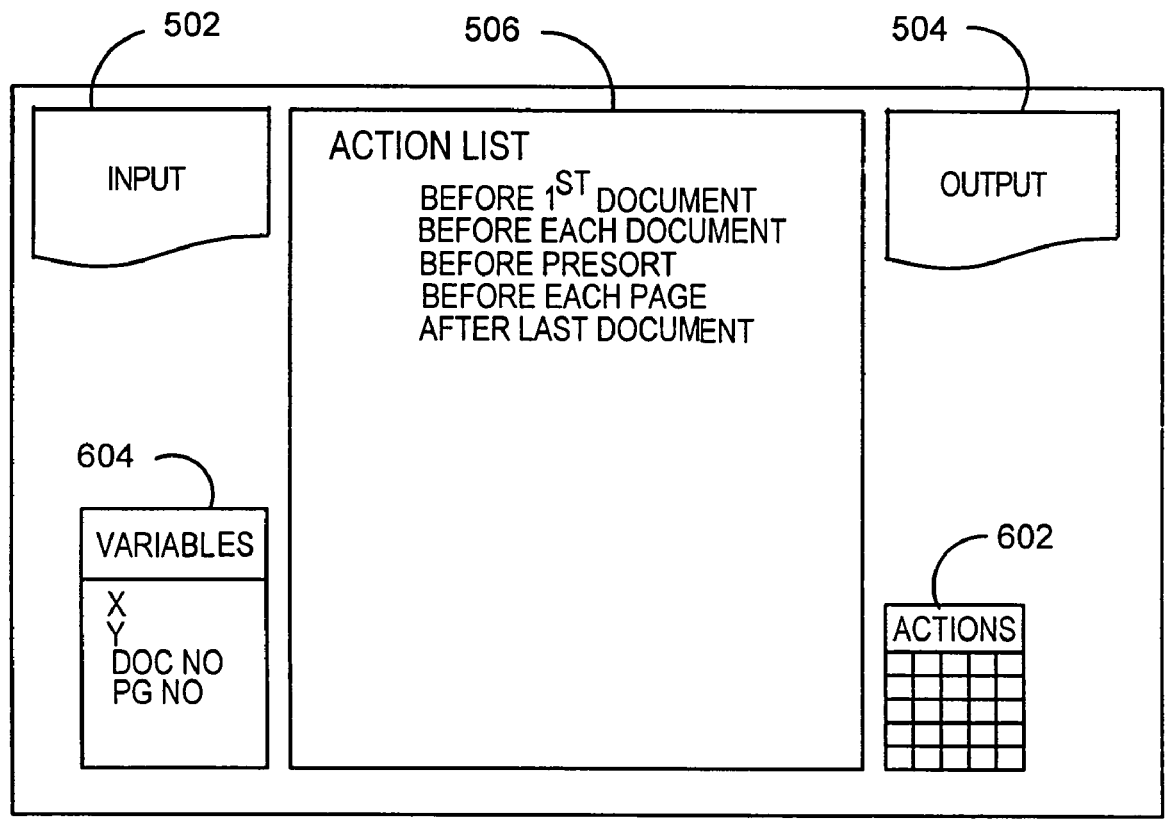
Figure 7:
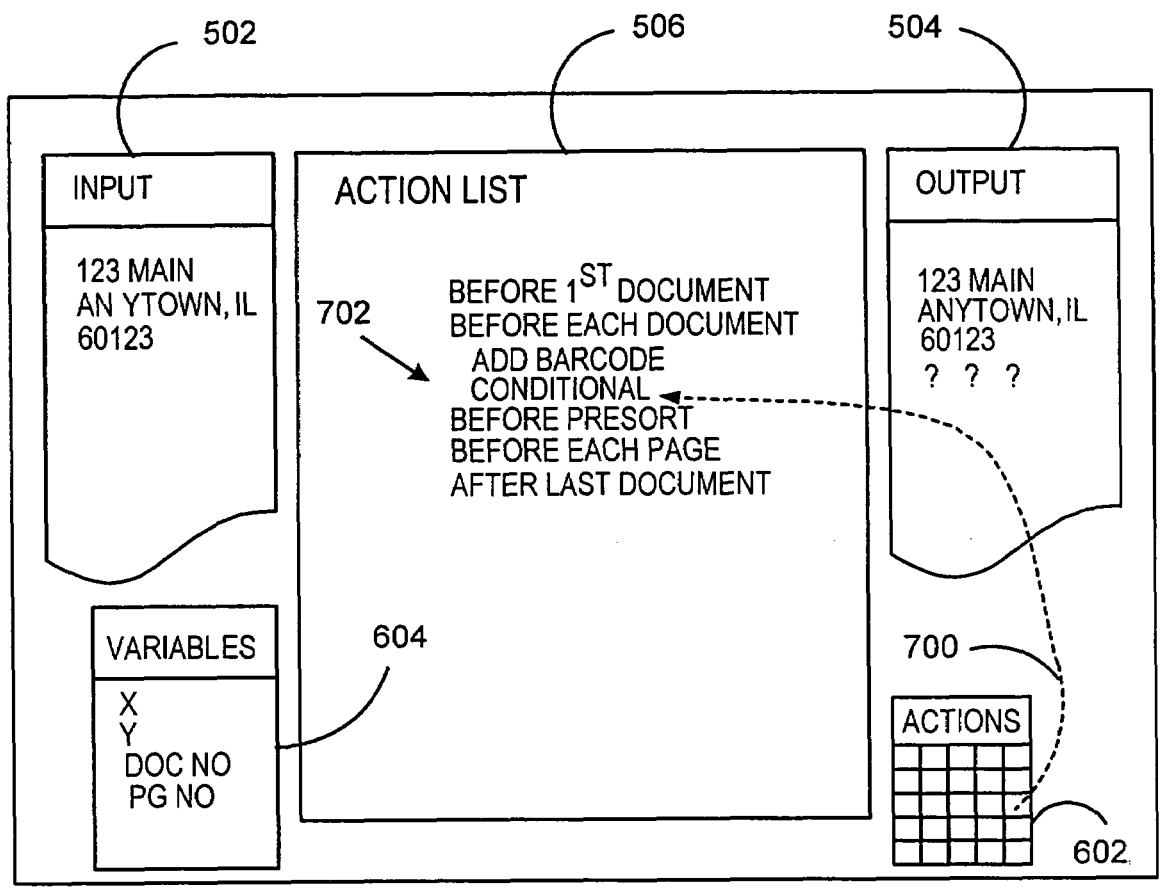

FIG. 6 shows the action list icon 506 in expanded form, listing stages of a print stream process. As will be seen, the user may select stages of the print stream process at which the system is to perform actions selected by the user. FIG. 6 also shows an actions pallet 602 and a variable list 604, both of which may be displayed simultaneously with the input file icon 502, the output file icon 504 and the action list icon 506. The actions pallet 602 may be displayed as a matrix of graphical objects such as icons and/or buttons or a list of text tags, with each icon, button or tag representing an action that may be selected by the user for inclusion in the action list. (To simplify the drawing, only matrix cells of the actions pallet 602 are shown, without the corresponding icons, buttons or tags.)

If more than one input file is to be used to derive the output file (or output files), more than one input file icon may be displayed in the application view, with each input file icon representing a respective input file. If more than one output file is to be derived from the input file (or input files), more than one output file icon may be displayed in the application view, with each output file icon representing a respective output file. The number of input file icons to be displayed and the number of output file icons to be displayed are selectable by the user. The user may select an input file icon to assign attributes to the icon such as file name and location or print stream type. This may be done, for example, by user interaction with a dialog box (which may be named "File Properties", for example). The dialog box (which is not shown) may be used to set file attributes for the input file such as name, location and/or print stream type. If the user has identified a particular file as being represented by the input file icon, the user may open the document in a document viewer (not shown).

The action list icon 506 represents a list of modifications (actions) to be performed by the system on the input print stream(s). Upon initialization of a new project, the list of actions is empty. As will be seen, the list of actions may be populated with actions from the actions pallet 602 in response to user input.

The output file icon is initialized to be identical to the input file icon, but may be modified in response to actions that are added to the list of actions.

Referring again to FIG. 4, with the application view being displayed, the system 100 receives user input, as indicated at step 402, and modifies the list of actions represented by the action list icon 506 in response to the user icon. The modification of the list of actions is indicated by step 404 in FIG. 4. Then, at step 406, the system generates rules to derive the output file or files represented by the output file icon(s) 504 from the input file or files represented by the input file icon(s) 502. The rules generated by the system correspond to the actions of the list of actions represented by the action list icon 506.

To generate an application which includes rules for modifying a print stream, the user selects an action from the action pallet 602 and drags the selected action to the action list icon 506. The user "drops" the selected action in the action list icon 506 at the appropriate stage (as determined by the user) in the print stream process. If one or more actions are already present at that stage of the print stream process, the user may place the newly selected action at any point among the already present actions, to select the order in which the actions are to be performed.

When an action dragged from the actions pallet 602 is dropped in the action list icon 506, the user may be prompted to specify one or more attributes of the action or may specify one or more attributes of the action by opening a dialog box. Assume, for example, that the user wishes to add a barcode of a zip code to the output document. In that case the user may initially interact with the input file icon 502 to open up the corresponding input file, highlight the zip code in the input file, and create a field, which may be labeled "zip". Next the user drags an "add_barcode" action from the actions pallet 602 to an appropriate location in the action list icon 506. The user may, via a dialog box (not shown), specify attributes for the barcode such as type, size and/or orientation. Then, the user may identify the field to be used to generate the barcode by dragging the "zip" field (not shown) from the input file icon 502 to the add_barcode action (not shown in FIGS. 5 and 6) in the action list icon 506. The display may be modified to show a link (e.g., by drawing a line, not shown) between the "zip" field in the input file icon and the add_barcode action whenever the add_barcode action is selected by the user.

Once the user has identified the source for the barcode and defined the attributes for the barcode, a barcode icon (not shown, may have the selected appearance of the barcode itself) may be displayed in the action list icon 506. The user may then drag the barcode icon to any point in the output file icon 504 to indicate that the barcode is to be included at the corresponding point in a document which corresponds to the output file represented by the output file icon 504. Again, when the add_barcode action is selected by the user, a line (not shown) or the like may be shown on the display to link the barcode on the output file icon with the action.

In this case, if no other actions are added to the action list, the system will generate rules to print an output document that corresponds to the input file, but with the addition of a barcode as defined and located in the output document in accordance with the user input provided via the application view user interface. It will be appreciated from the drawings that the output document may be, for example, a letter, bill, statement, invoice or envelope.

In some embodiments, conditional actions may be added to the list of actions represented by the action list in response to user input. Assume, for example, that the user desires that the output document include a barcode which corresponds to the zip code only when the "state" field of the address is "IL" (state code for "Illinois"). In this case, the user may define the "zip" field in the input file, as in the previous example, and may also define the "state" field in the input file. The user may then drag an icon or tag which indicates a conditional add_barcode action from the actions pallet 602 to the action list icon 506, as indicated at 700 in FIG. 7. The icon may be dropped at the "before each document" stage of the action list, as indicated at 702. Next the user may open a conditional action dialog box (by e.g., "right-clicking" the text "conditional" in the action list icon 506). A "wizard" function may guide the user to create an expression like "State='IL'". In some embodiments, the portion of the expression which indicates "State" may be entered by typing in the text "State", selecting "State" from a list, or dragging the relevant field (not shown) from the input file icon 502.

Figure 8:
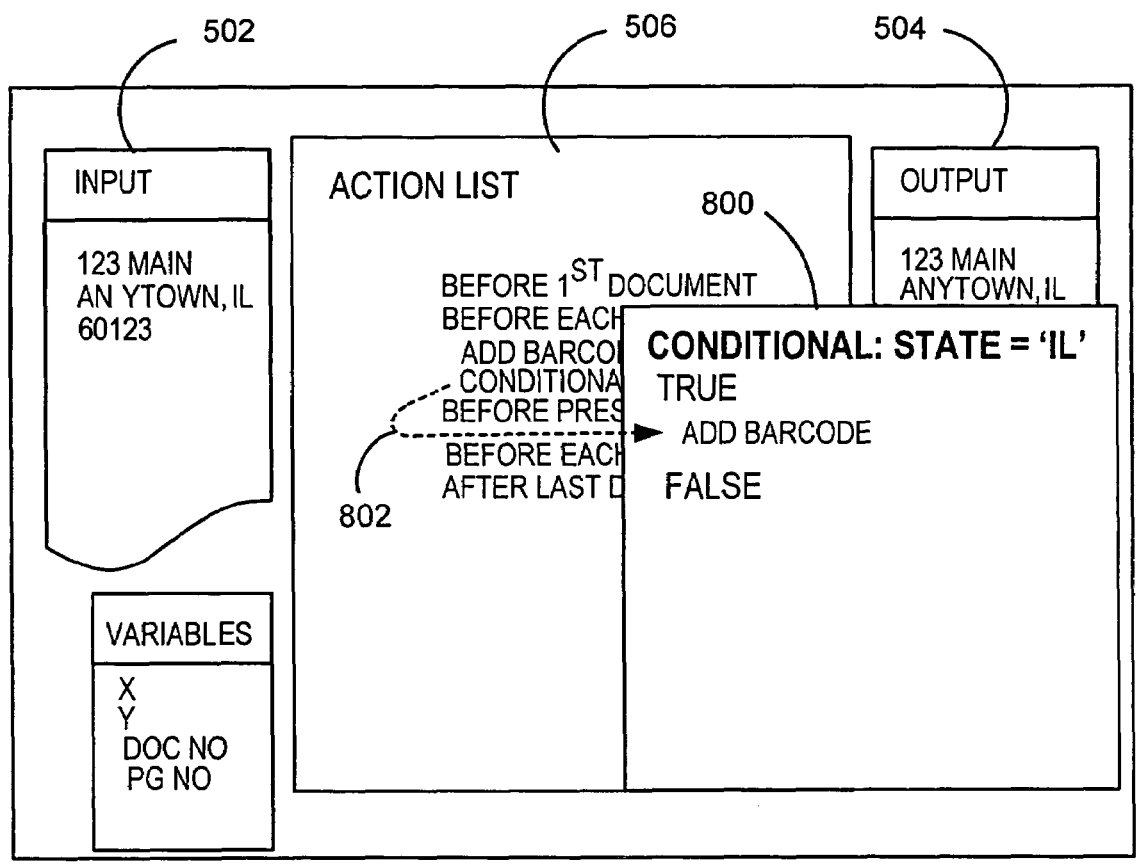

The user may then "double click" the "conditional" text in the action list icon 506 to bring up a secondary action list icon 800 (FIG. 8). It will be observed from FIG. 8 that the secondary action list icon 800 has a "True" part and a "False" part. The user can then drag the add_barcode action, as indicated at 802 in FIG. 8, from the action list icon 506 to the "True" part of the secondary action list icon 800. The user may then define attributes of the add_barcode action as in the previous example, including dragging the "zip" field (not shown) from the input file icon 502 to the action list icon 502 or the secondary action list icon 800, and dragging the resulting barcode icon (not shown) from the action list icon 502 or the secondary action list icon 800 to the desired location in the output file icon 504.

Output file(s) represented by the output file icon or icons are derived by the system 110 from input file(s) represented by the input file icon or icons in accordance with rules that reflect the list of actions specified by the user by interacting with the application view. The user may enter a dialog box associated with each output file icon to specify the file name and location, allocation information, etc. for the corresponding output file. In some cases, if the output file already exists, the user may select the existing file, in which case the attributes of the existing file are copied into the dialog box. The user may elect to hide elements of the output files in the display of the output files as part of the output file icons. The format(s) indicated by the output file(s) may be used by the system 100 to control print runs executed by the system 100.

In some embodiments, the system 100 may provide to the user additional interactive views besides the application view described above. For example, the system 100 may provide a "component view" as illustrated in FIG. 9.

Figure 9:
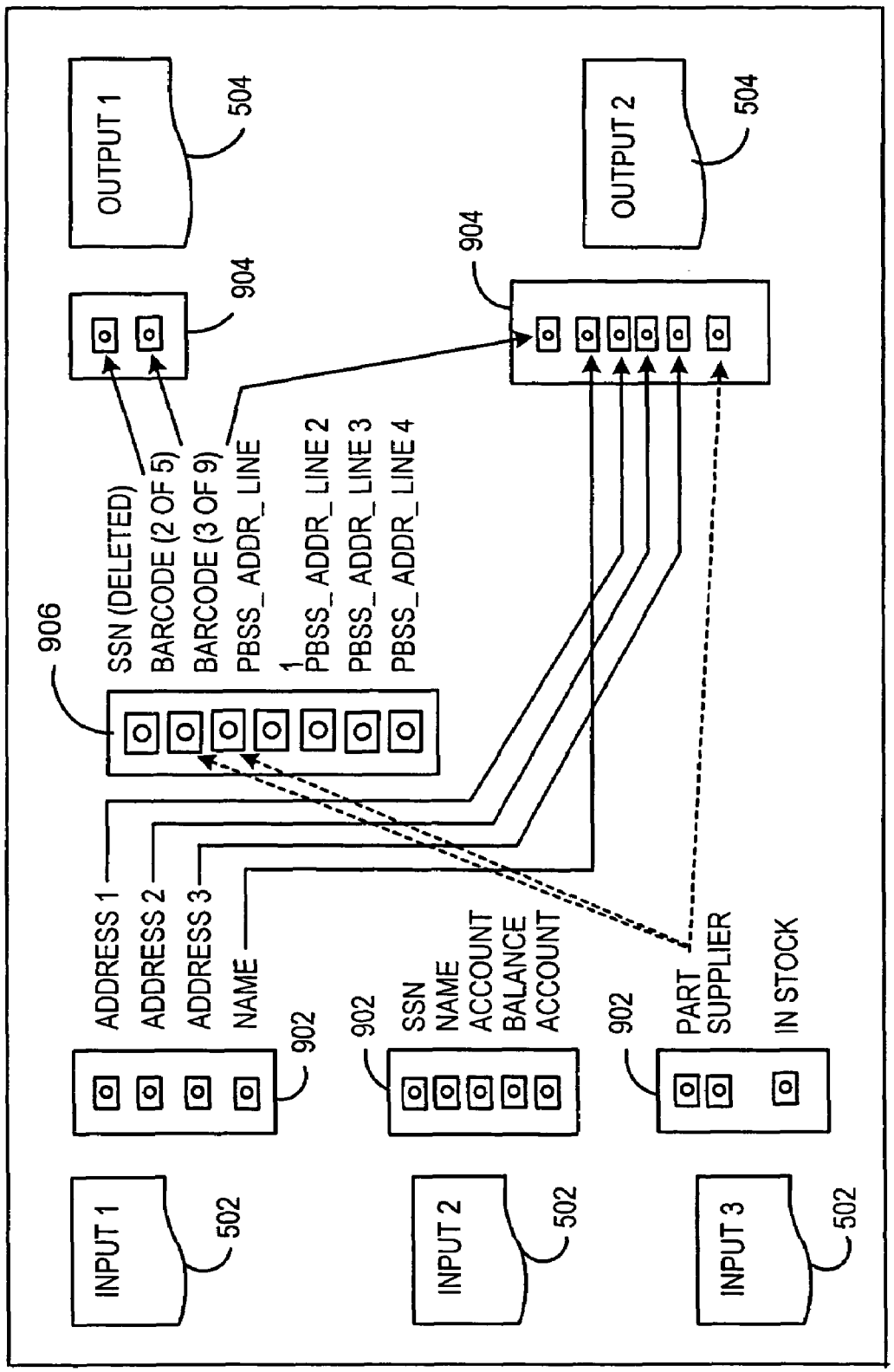

The component view shown in FIG. 9, like the application view, displays input file icons 502 and output file icons 504. The component view of FIG. 9 may also have the action list icon 506 of the application view, but the icon 506 is not shown in the drawing. The component view also displays input variable toolbars 902, each associated with a respective input file icon 502, and output variable toolbars 904, each associated with a respective output file icon 504. Each of the toolbars 902, 904 includes icons, buttons or the like which correspond to variables of the input or output file represented by the associated input file icon 502 or output file icon 504.

The component view also includes a print stream process object toolbar 906. The toolbar 906 includes icons, buttons or the like which each represent a respective print stream process object created by the user. The user may have created print stream process objects by manipulating the action list icon as described above in connection with the application view (e.g., by inserting an add_barcode action into the action list). Alternatively, the user may right-click an item on one of the input variable toolbars 902 to bring up an option to create a print stream process object by using the corresponding input variable. As another alternative, a menu (not shown) may provide a menu selection to create a "new object", and the user may select that menu selection. A list (not shown) of available objects may then be presented for selection, with dialog boxes or the like provided to allow the user to define the new print stream process object.

If the user selects an item on the print stream process object toolbar 906, properties of the corresponding object are displayed (display not shown) and the user is allowed to modify the object. The properties of the print stream process object may include input variable(s) used to derive the print stream process object, and output variable(s) which result from the print stream process object.

By interacting with the component view, the user may select either input variables or print stream process objects to be included in output documents.

In some embodiments, the user may be permitted to reposition the toolbars within the component view.

The system 100 may also provide a "list view" as shown in FIG. 10. The list view lists input variables and print stream process objects as row entries in a matrix for which the columns correspond to process stages. By selecting a matrix location, the user may enter a rule editor function to view and/or edit processing rules that have been generated by the system with respect to the corresponding input variable or print stream process object. In some embodiments, the rule editor can also be entered from the action list icon and/or via a menu command (menu not shown).

Upon entering the rule editor, the user may be presented with a dialog box (not shown) that allows the user to insert code and/or functions, using pseudo-code syntax, to modify or add rules to the print stream process to be performed by the system. The rules/functions that may be defined using the rule editor may include one or more of the following among others: a loop statement; an if construct with unlimited else/else if and nesting; variable definition; variable value setting; property value setting; file-break setting; tray-break setting (e.g., in connection with pre-sort processing); insertion of comments; creation of expressions (using an expression editor). The rule editor may also allow rule statements to be repositioned in a list of statements or for rule statements to be deleted or added.

The user interface provided by the system 100 allows the user to employ "drag and drop" techniques to define print stream process applications easily and intuitively, without requiring that the user have detailed knowledge of the characteristics of input files. Thus print stream process tools, such as the above-mentioned "Streamweaver" tool, may be conveniently operated by relatively untrained users.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for automated modification of documents in a printstream comprising:
    displaying on a display device (i) a first icon that represents a printstream input file, (ii) a second icon that represents a printstream output file to be derived at least in part from the input file, and (iii) a third icon that represents a list of actions to be performed to derive the output file;
    receiving user input;
    modifying the list of actions in response to the user input;
    generating rules to derive the output file, said rules corresponding to the actions of the list of actions;
    displaying an actions pallet on the display device simultaneously with the first, second and third icons;
    wherein the receiving step includes a user dragging an item from the actions pallet to the third icon;
    wherein the receiving step includes the user dragging an item from the first icon to the third icon to associate the item from the first icon with an action of the list of actions; and
    wherein the receiving step includes the user dragging an item from the third icon to the second icon to define an attribute of an action of the list of actions.

2. The method according to claim 1, wherein the displaying step includes displaying the first, second and third icons simultaneously on the display device.

3. The method according to claim 2, wherein the third icon is displayed between the first and second icons.

4. The method according to claim 1, wherein the receiving step includes the user defining a condition that is applicable to an action of the list of actions.

5. The method according to claim 1, further comprising:
    displaying a variables list on the display device simultaneously with the first, second and third icons and with the actions pallet.

6. The method according to claim 1, wherein the output file is for printing a letter or an envelope.

7. An apparatus for automated modification of documents in a printstream, the apparatus comprising:
    at least one processor;
    a display device controlled by the at least one processor;
    at least one memory in communication with the at least one processor and storing instructions to cause the at least one processor to:
        display on the display device (i) a first icon that represents a printstream input file, (ii) a second icon that represents a printstream output file to be derived at least in part from the input file, and (iii) a third icon that represents a list of actions to be performed to derive the output file;
        receive user input;
        modify the list of actions in response to the user input; and
        generate rules to derive the output file, said rules corresponding to the actions of the list of actions;
    wherein the instructions further cause the at least one processor to:
        display an actions pallet on the display device simultaneously with the first, second and third icons;
        wherein the receiving of the user input includes a user dragging an item from the actions pallet to the third icon;
        wherein the receiving of the user input includes the user dragging an item from the first icon to the third icon to associate the item from the first icon with an action of the list of actions; and
        wherein the receiving of the user input includes the user dragging an item from the third icon to the second icon to define an attribute of an action of the list of actions.

8. The apparatus according to claim 7, wherein the first, second and third icons are simultaneously displayed on the display device.

9. The apparatus according to claim 8, wherein the third icon is displayed between the first and second icons.

10. The apparatus according to claim 7, wherein the receiving of the user input includes the user defining a condition that is applicable to an action of the list of actions.

11. The apparatus according to claim 7, wherein the instructions further cause the at least one processor to:
    display a variables list on the display device simultaneously with the first, second and third icons and with the actions pallet.

12. The apparatus according to claim 7, wherein the output file is for printing a letter or an envelope.

* * * * *

UNITED STATES PATENT AND TRADEMARK OFFICE
CERTIFICATE OF CORRECTION

| | | |
|---|---|---|
| PATENT NO. | : 7,594,184 B2 | Page 1 of 1 |
| APPLICATION NO. | : 10/936267 | |
| DATED | : September 22, 2009 | |
| INVENTOR(S) | : Julitz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Twenty-eighth Day of September, 2010

David J. Kappos
*Director of the United States Patent and Trademark Office*